United States Patent

Heydinger et al.

[11] Patent Number: 5,809,215
[45] Date of Patent: Sep. 15, 1998

[54] METHOD OF PRINTING TO INHIBIT INTERCOLOR BLEEDING

[75] Inventors: Scott Michael Heydinger; Robert Frederick Locasto; Sandra Helton McCain; Ajay Kanubhai Suthar, all of Lexington, Ky.

[73] Assignee: Lexmark International, Inc., Lexington, Ky.

[21] Appl. No.: 634,455

[22] Filed: Apr. 18, 1996

[51] Int. Cl.[6] ................................ H04N 1/50; B41J 2/21
[52] U.S. Cl. ..................... 395/109; 358/502; 358/540; 347/43
[58] Field of Search .................. 395/109; 358/502, 358/501, 530, 540; 347/12, 43, 9, 15, 41

[56] References Cited

U.S. PATENT DOCUMENTS

| | | | |
|---|---|---|---|
| 4,748,453 | 5/1988 | Lin et al. ................... | 347/41 |
| 4,965,593 | 10/1990 | Hickman . | |
| 5,012,257 | 4/1991 | Lowe et al. ................. | 347/43 |
| 5,168,552 | 12/1992 | Vaughn et al. . | |
| 5,233,366 | 8/1993 | Stephany .................... | 347/15 |
| 5,398,124 | 3/1995 | Hirota . | |
| 5,428,377 | 6/1995 | Stoffel et al. ............... | 347/15 |
| 5,475,800 | 12/1995 | Vaughn et al. .............. | 395/109 |
| 5,477,335 | 12/1995 | Tai . | |
| 5,488,398 | 1/1996 | Matsubara et al. .......... | 347/43 |
| 5,500,662 | 3/1996 | Watanabe . | |
| 5,506,609 | 4/1996 | Classen et al. .............. | 347/41 |
| 5,568,169 | 10/1996 | Dudek et al. ............... | 347/43 |
| 5,602,572 | 2/1997 | Rylander .................... | 347/15 |
| 5,748,207 | 5/1998 | Inui et al. ................... | 347/43 |

FOREIGN PATENT DOCUMENTS

| | | | |
|---|---|---|---|
| 0 590 853 A1 | 6/1994 | European Pat. Off. ........... | B41J 2/21 |
| 0 590 854 A1 | 6/1994 | European Pat. Off. ........... | B41J 2/21 |

*Primary Examiner*—Scott Rogers
*Attorney, Agent, or Firm*—John J. McArdle, Jr.; Ronald K. Aust; Todd T. Taylor

[57] ABSTRACT

The invention is directed to a method of printing using an ink jet printer which jets a first color ink and a second color ink onto a print medium at locations defined by an image area having a plurality of pixels. The method inhibits intercolor bleeding between the first color ink and the second color ink. A first array of pixels in the image area is selected, with the first array being an M×N array wherein M and N are integers. A portion of the first array is defined as a second array of pixels, with the second array being an X×Y array wherein X and Y are integers. The integers X and Y are smaller than the integers M and N, respectively. The pixels within the second array are examined. The pixels within the first array are altered if the examined pixels within the second array substantially all correspond to the first color ink.

40 Claims, 3 Drawing Sheets

METHOD OF PRINTING TO INHIBIT INTERCOLOR BLEEDING

BACKGROUND OF THE INVENTION

1. Field of the Invention

The present invention relates to ink jet printers, and, more particularly, to a method of preventing intercolor bleeding when using multi-color ink jet printers.

2. Description of the Related Art

A multi-color ink jet printer typically includes structure for selectively jetting a cyan, yellow, magenta and/or true black ink onto a print medium such as paper. To provide for an increased overall print quality, it is known to use a high surface tension, pigmented true black ink and a penetrating cyan, yellow and magenta color ink. The high surface tension, pigmented true black ink tends to penetrate slowly into the paper, resulting in a higher optical density of solid black areas, less feathering (or spreading) of the true black ink, and fewer satellites (caused by ink drop breakup during flight). The penetrating cyan, yellow and magenta inks penetrate more rapidly into the paper and are used to avoid intercolor bleeding between the various color inks.

A problem which sometimes arises when using a higher surface tension, pigmented true black ink and a penetrating cyan, yellow and/or magenta ink is that when such inks are jetted onto the paper, the higher surface tension true black ink dot and the lower surface tension cyan, yellow and/or magenta ink dot tend to mix. It is believed by the present inventors that the more slowly drying true black ink dot, when still wet, mixes slightly with the penetrating agents present in the cyan, yellow and/or magenta ink dots, which causes the true black ink dot disposed near the cyan, yellow and/or magenta ink dot to penetrate into the paper as well. This mixing is most pronounced when a solid black area is printed next to a cyan, yellow and/or magenta ink area, which causes a visually objectionable print artifact.

One known method of inhibiting intercolor bleeding is to separately examine each single pixel in an image area to determine if the individual pixel is a black pixel which lies adjacent to a color pixel. If the examined, single pixel lies adjacent to a color pixel, then a faster drying process black (CYM black) ink dot is substituted for a true black ink dot. Alternatively, if the examined, single pixel corresponds to a black ink dot at the edge of a substantial black area, then a row of color dots immediately adjacent to the black area may be removed.

It is also known to divide a plurality of pixels making up an image area into a plurality of 2×2 array of cells. Drops of cyan, yellow and/or magenta ink are deposited only on a diagonally adjacent pair of cells, with no more than two drops of ink per cell and no more than three drops of ink per 2×2 array. Thus, in essence, the pixels of the image area are printed in a "checkerboard" manner which reduces intercolor bleeding.

What is needed in the art is an improved method of printing using a multi-color ink jet printer which reduces or inhibits intercolor bleeding between different color inks.

SUMMARY OF THE INVENTION

The present invention provides a method of printing which inhibits intercolor bleeding, wherein a portion of an image area is divided into a smaller array of pixels disposed within a larger array of pixels. If all of the pixels within the smaller array are determined to be true black pixels, the remaining color pixels within the larger array are altered, such as by removing a portion of the available color pixels within the larger array.

The invention comprises, in one form thereof, a method of printing using an ink jet printer which jets a first color ink and a second color ink onto a print medium at locations defined by an image area having a plurality of pixels. The method inhibits intercolor bleeding between the first color ink and the second color ink. A first array of pixels in the image area is selected, with the first array being an M×N array wherein M and N are integers. A portion of the first array is defined as a second array of pixels, with the second array being an X×Y array wherein X and Y are integers. The integers X and Y are smaller than the integers M and N, respectively. The pixels within the second array are examined. The pixels within the first array are altered if the examined pixels within the second array substantially all correspond to the first color ink.

An advantage of the present invention is that intercolor bleeding is inhibited.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figures 1A, 1B, 1C, 2A, 2B, 2C:
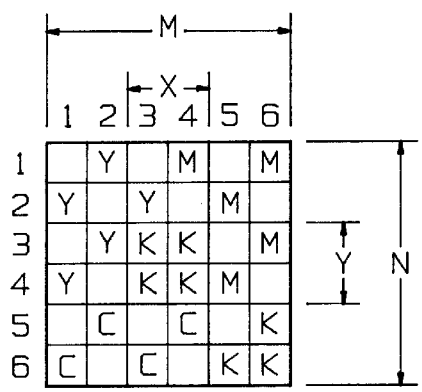
FIGS. 1A, 1B and 1C are graphical illustrations showing alteration of the pixels in a portion of an image area using a method of the present invention to inhibit intercolor bleeding.
FIGS. 2A, 2B and 2C are graphical illustrations showing a different alteration of the pixels in a portion of an image area using a method of the present invention to inhibit intercolor bleeding.

Referring now to the drawings, and more particularly to FIGS. 1 and 2, there are shown respective graphical illustrations depicting alteration of the pixels in a portion of an image area using a method of the present invention to inhibit intercolor bleeding. The method is employed by using an ink jet printer which jets a first color ink (such as a true black ink) and a second color ink (such as a cyan, yellow or magenta ink) onto a print medium at locations defined by an image area having a plurality of pixels. The image area may be represented by a bit map stored in a memory. It is thus possible to associate a plurality of bits in the bit map with a plurality of corresponding pixels representing image data for the various colored inks which are jetted onto the print medium. The method of the present invention inhibits intercolor bleeding between the first color ink and the second color ink in a manner as described below.

FIGS. 1A–1C and FIGS. 2A–2C show alternative graphical representations of pixels which may be altered using the method of the present invention. With each of the graphical illustrations shown in FIGS. 1A–1C and FIGS. 2A–2C, the image area represented by the bit map stored in memory is selectively divided into a plurality of arrays of pixels with the arrays being of uniform size. For example, in the embodiment shown in FIGS. 1A–1C and FIGS. 2A–2C, the image area is divided into a plurality of 6×6 arrays which overlap with each other, as will be described below. For ease of discussion, reference numbers 1–6 have been placed along the top and left side of the arrays shown in FIGS. 1A–1C and 2A–2C. Thus, the pixel at the top, left corner of each array is disposed at position 1,1.

A first or super array of pixels in the image area is defined by pixels 1,1 through 6,6. The first array has a width dimension M and a height dimension N as shown in FIGS. 1C and 2C, with the values of M and N being integers. In the particular embodiment shown, the integer values M and N are each equal to 6; however, other integer values for the variables M and N are also possible. The integer values M and N are preferably between 3 and 10, and are more preferably both equal to the integer value 6. Moreover, the integer values M and N can be equal to or different from each other, such that the first array of pixels is either square or rectangular.

The first array is represented in the bit map as image data associated with the pixels 1,1 through 6,6. The image data represents color dots to be printed on the print medium such as true black (K), yellow (Y), magenta (M), and cyan (C). The cyan, yellow and magenta dots may be disposed adjacent to the true black dots (K) and thus result in intercolor bleeding. To inhibit the intercolor bleeding, a second array of pixels is defined within a portion of the first array of pixels. In the embodiment shown, the second array of pixels is a 2×2 array which is centrally located within the first array of pixels. The second array of pixels is thus positioned at locations 3,3; 3,4; 4,3; and 4,4. The second array of pixels thus also has the dimensions X and Y (FIGS. 1C and 2C) with X and Y being integers. The integers X and Y are smaller than the integers M and N, respectively, and are equal to 2 in the embodiment shown. It will be appreciated that the variables X and Y may be equal to each other or different, such that the second array of pixels can be square or rectangular.

The pixels within the X×Y or second array of pixels are examined to determine whether the image data corresponding thereto corresponds to the first color ink (e.g., the true black ink). If substantially all of the pixels within the second array correspond to the first color ink, then the pixels within the first array, exclusive of the pixels within the second array, are altered in a particular manner. Alternatively, the pixels within the first array, exclusive of the pixels within the second array, may be altered if a certain percentage of the examined pixels within the second array correspond to the first color ink. For example, depending upon the particular application and/or the selected sizes of the first and second arrays of pixels, the pixels within the first array may be altered if at least approximately 50%, 75%, or 90% of the examined pixels within the second array correspond to the first color ink.

Referring to FIG. 1B, one method of altering the pixels within the first array, exclusive of the pixels within the second array, is shown. In this embodiment, the pixels of the second array (i.e., pixel locations 3,3; 3,4; 4,3; and 4,4) correspond to true black ink dots (K) which are to be jetted onto the print medium. Since all of the pixels of the second array correspond to true black ink, the remaining pixels of the first array are altered by removing selected ones of the remaining pixels of the first array as available pixels for printing. The reference letter "R" indicates those pixels which have been removed as available pixels for printing. For ease of visualization and discussion, the remaining pixels of the first array have not been labeled with the corresponding ink colors (e.g., at pixel locations 1,2 and 1,4). As is apparent, the pixels which are removed as available pixels for printing form a "checkerboard" pattern about the second array of pixels.

Referring now to FIG. 1C, a graphical illustration of the pixels corresponding to the color dots which are actually printed on the print medium is shown after the alteration of pixels is carried out according to the illustration of FIG. 1B. The cyan, yellow and magenta dots are jetted onto the print medium in a checkerboard manner which is complementary to the removed pixels shown in FIG. 1B. Some of the cyan, yellow and magenta dots are disposed immediately adjacent to the true black dots within the second array of pixels. However, it has been found that even though some of the dots may lie immediately adjacent to the true black area within the second array, intercolor bleeding is inhibited by the reduction in the number of color dots remaining within the first array.

Referring now to FIG. 2B, another method of altering the pixels within the first array, exclusive of the pixels within the second array, is shown. The removed pixels are labeled "R," and the remaining pixels within the first array of pixels are not labeled for ease of discussion and visualization. In the embodiment shown in FIG. 2B, all of the pixels within the second array of pixels correspond to true black ink dots (K). The pixels within the first array, exclusive of the pixels within the second array, are altered by removing all of the pixels within the first array that are disposed adjacent to the second array, as indicated by the pixels marked with the reference letter "R". This provides a separation zone between the true black ink dots within the second array and the cyan, yellow and magenta ink dots within the first array, and thereby inhibits intercolor bleeding.

Referring now to FIG. 2C, a graphical representation of the pixels corresponding to the ink dots which are actually printed on the print medium is shown after some of the pixels within the first array are removed as shown in FIG. 2B. The pixels disposed immediately adjacent to the true black pixels (K) of the second array do not contain image data therein, and thus no cyan, yellow magenta ink is deposited at corresponding locations on the print medium. This separation zone between the true black pixels of the second array and the printed color pixels within the first array inhibits intercolor bleeding.

As may be seen in FIG. 1C, the true black pixels which are disposed within the first array of pixels, but outside of the second array of pixels (e.g., pixel location 6, 6), need not be altered. That is, intercolor bleeding does not occur between the true black pixels disposed within the second array and any remaining true black pixels disposed within the first array. Accordingly, such remaining true black pixels within the first array need not be removed as available pixels for printing.

Another aspect of the present invention is that the remaining pixels within the first array may not be altered if the number of cyan, yellow or magenta dots is determined to be such that intercolor bleeding is not likely to result. To wit, after the pixels of the second array are examined as to whether or not the image data therein corresponds to substantially all true black pixels, a determination may be made as to whether a predetermined percentage of the remaining pixels within the first array correspond to the cyan, yellow and/or magenta ink. If the percentage of the remaining pixels within the first array, exclusive of the pixels within the second array, do not correspond to cyan, yellow or magenta ink dots, the quantity of colored ink dots which are jetted onto the print medium around the second array of ink dots may not be of sufficient magnitude to result in intercolor bleeding. Accordingly, it may not be necessary to remove available pixels for printing within the remaining pixels of the first array, as shown in FIGS. 1B and 2B. In the embodiments shown, the remaining pixels within the first array are not altered unless approximately 50% of the remaining pixels within the first array correspond to cyan, yellow or magenta ink dots. It will be appreciated, however, that the remaining pixels within the first array may not be altered unless a different percentage of pixels corresponds to cyan, yellow or magenta ink dots, such as 70% or 80%.

With regard to the graphical illustrations shown in FIGS. 1A–1C and 2A–2C, it may also be desirable for certain applications to alter the pixels within the first array, exclusive of the pixels within the second array, dependent upon the particular color of the pixels within the first array. For example, if the pixels within the first array, exclusive of the pixels within the second array, correspond primarily to cyan or magenta ink dots which are to be jetted onto the print medium, it may be desirable to alter the pixels within the first array using the checkerboard manner of depletion as shown in FIGS. 1A–1C. Alternatively, if the pixels within the first array, exclusive of the pixels within the second array, correspond primarily to yellow ink dots which are to be jetted onto the print medium, it may be desirable to alter the pixels within the first array as shown in FIGS. 2A–2C such that the pixels adjacent to the smaller, second array are depleted.

Figure 3:
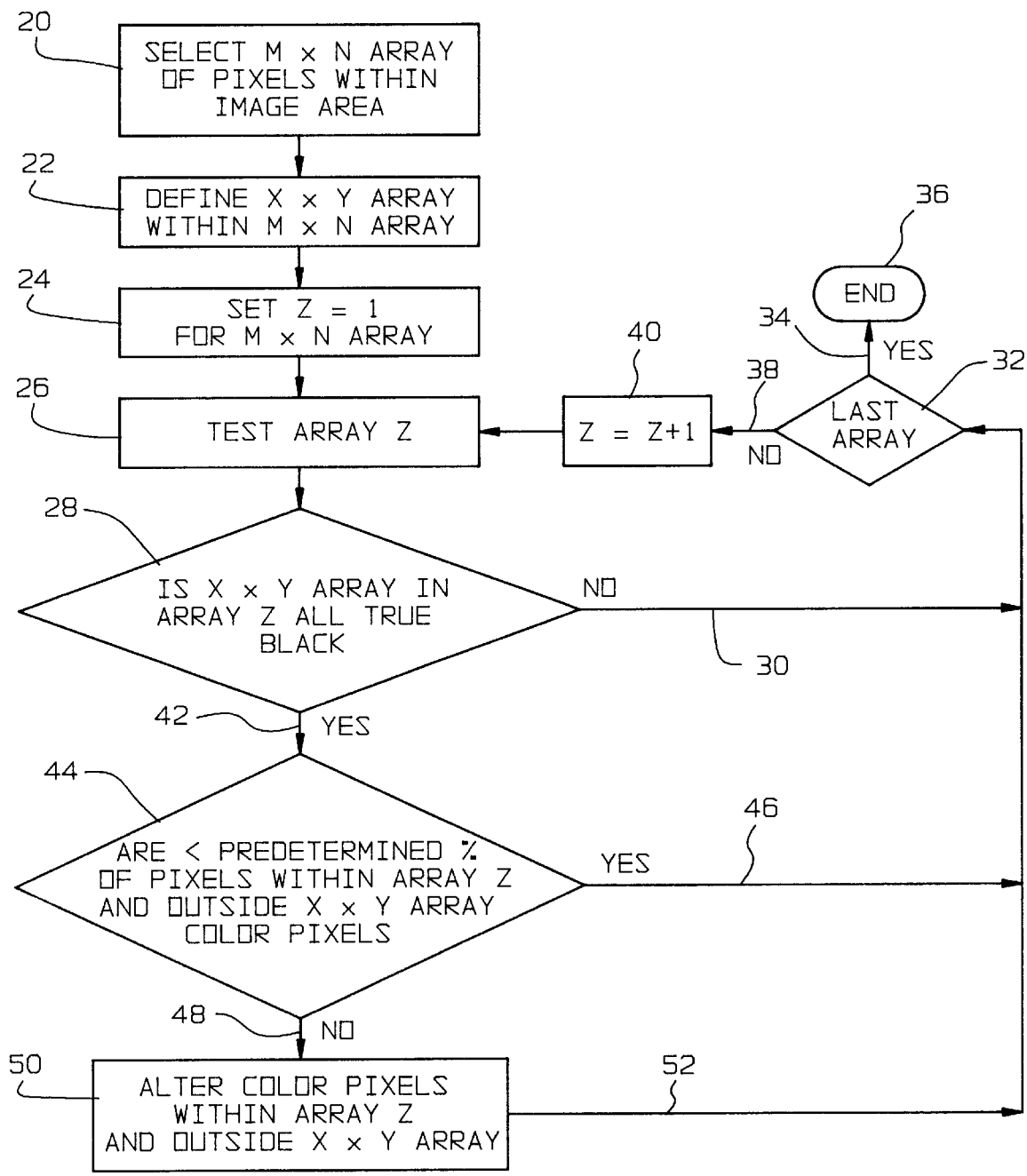
FIG. 3 is a flowchart illustrating an embodiment of the overall logic of the printing method of the present invention.

Referring now to FIG. 3, there is shown a flowchart illustrating an embodiment of the overall logic of the printing method of the present invention. First, an M×N array of pixels within the image area is selected (block 20). In essence, this consists of overlying an array of predetermined dimensions M×N on the bit map stored within memory having image data stored therein corresponding to the various color inks which are to be applied to the print medium. An X×Y array is defined within each M×N array, as described above with reference to FIGS. 1 and 2 (block 22). The X×Y array may be centrally located within the M×N array, but may also be positioned other than centrally located within the M×N array. For the particular selected M×N array of pixels within the image area, a variable "Z" is assigned thereto. The variable Z thus represents the position of the M×N array within the image area. At block 24, the value Z is set to 1 for the first selected array. At block 26, the particular selected M×N array, designed by the variable Z, is tested. This consists of examining the pixels within the X×Y array (or second array) in the M×N array (Z=1) to determine whether all of the pixels therein correspond to true black image data (decision block 28). If the result is NO (line 30), a decision is then made as to whether a particular array Z being tested is the last array within the image area (decision block 32). If the array is the last to be tested within the image area (line 34), then the method ends at 36. On the other hand, if the tested array is not the last array to be tested (line 38), then the value of Z is incremented by 1 (block 40) and a new array Z is tested at block 26. The new array Z corresponds to an array representing a different associated set of pixels within the image area of the bit map. As the M×N array is moved to a new location within the bit map, the X×Y array also moves to the new location within the bit map. The M×N array and the X×Y array each retain their relative sizes when moved from one location to another in the bit map. Moreover, the X×Y array is positioned at the same relative location within the M×N array.

If the pixels within the X×Y array are examined and found to be all true black pixels (line 42), then a decision is made as to whether a predetermined percentage of the pixels within array Z and outside of the X×Y array are cyan, yellow and/or magenta pixels (decision block 44). If there is less than a predetermined percentage of pixels (e.g., 50%) within the remaining pixels of array Z (line 46), then control passes to decision block 32 as described above. On the other hand, if there are more than a predetermined percentage of cyan, yellow or magenta pixels within the remaining pixels of array Z (line 48), then the cyan, yellow and/or magenta pixels within array Z and outside of the X×Y array are altered as described above with reference to either of FIGS. 1B or 2B (block 50). After the color pixels within array Z have been altered, control passes via line 52 to decision block 32, as described above.

Figure 4:
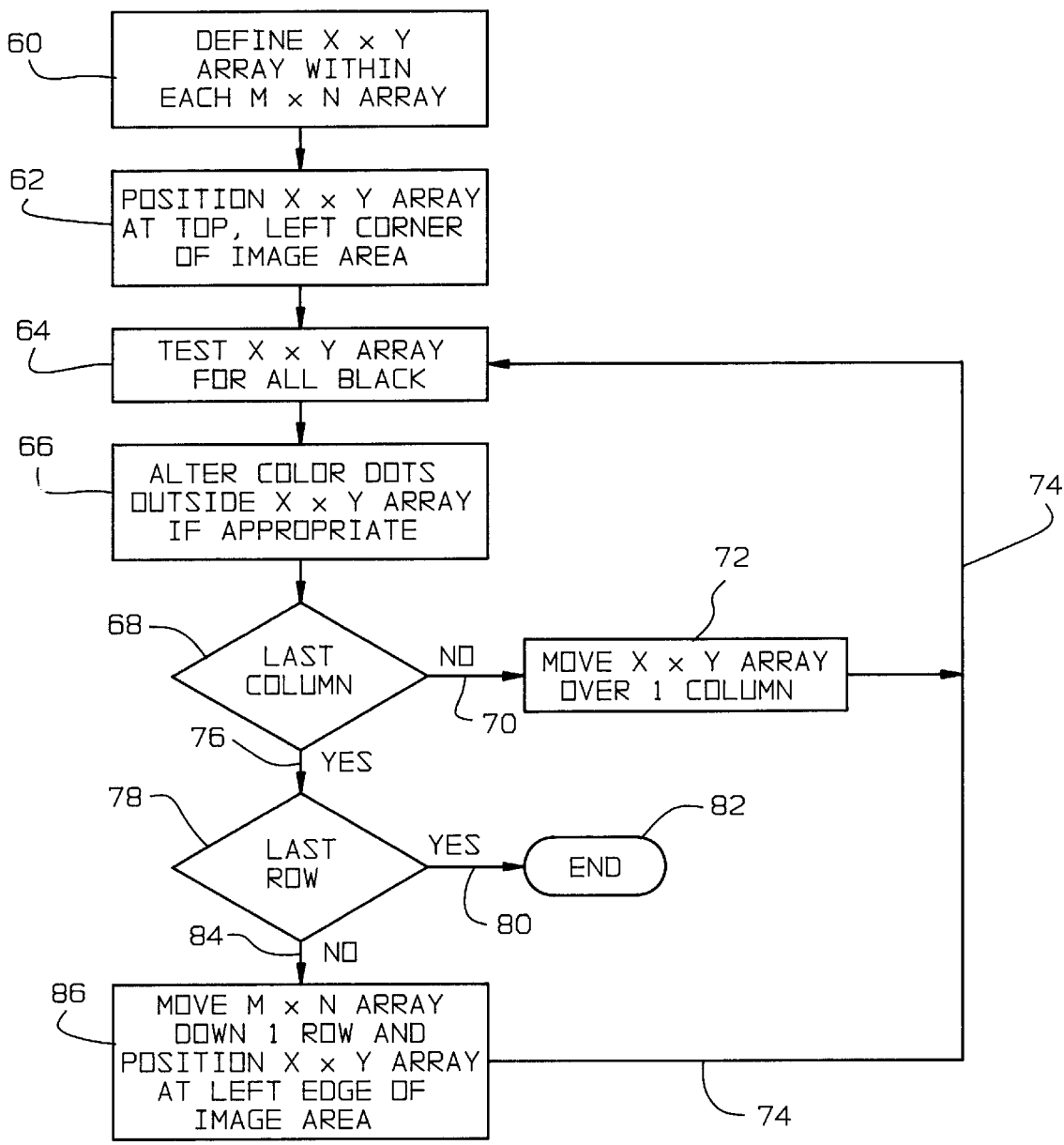
FIG. 4 is a flowchart illustrating an embodiment of the logic used to examine the image area of the print medium onto which the ink is jetted.

FIG. 4 is a flowchart illustrating an embodiment of the logic used to examine the image area of the print medium onto which the ink is jetted. The image area is represented by a bit map in a memory having corresponding image data therein. First, an X×Y array is defined within each M×N array as described above. The M×N array and the X×Y array may be rectangular or square. Moreover, the X×Y array may be centrally located, or other than centrally located, within the M×N array (block 60). With reference to the following description, it is to be understood that the X×Y array maintains its position within and relative to the larger M×N array. After the X×Y array is defined within the M×N array, the X×Y array is positioned at the top, left corner of the image area (block 62). Thus, with reference to the array shown in FIG. 1A, the top two rows and the left two columns are essentially positioned off of the bit map at this point in time. The X×Y array is then tested for all true black pixels (block 64). At block 66, the cyan, yellow and magenta dots that are disposed within the M×N array and outside the X×Y array are altered if appropriate (such as by determining whether a predetermined percentage of the pixels disposed outside the X×Y array are CYM pixels). Thereafter, a determination is made as to whether the X×Y array is disposed in the last column (decision block 68). In general, this means that the pixels of the X×Y array (or second array) would be disposed at the right edge of the bit map defining the image area. If the X×Y array is not disposed in the last column (line 70), then the X×Y array (along with the M×N array) is moved over one pixel or column to the right (block 72). Control then passes back to block 64 where the X×Y array is again tested for all true black.

If the X×Y array is disposed at the right edge of the bit map and the result from decision block 68 is YES (line 76), then a determination is also made as to whether the X×Y array is disposed in the last row of the image area (decision block 78). If the X×Y array is disposed in both the last column and the last row (line 80), then the method ends at 82. Alternatively, if the X×Y array is disposed in the last column, but not in the last row (line 84), then the M×N array and the X×Y array are moved down one row or pixel and the X×Y array is positioned at the left edge of the image area (block 86). Control then passes back to block 64 via line 74

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of printing using an ink jet printer which jets a first color ink and a second color ink onto a print medium at locations defined by an image area having a plurality of pixels, said method inhibiting intercolor bleeding between the first color ink and the second color ink, said method comprising the steps of:

selecting a first array of pixels in the image area, said first array comprising an M×N array with M and N being integers;

defining a portion of the first array as a second array of pixels, said second array comprising an X×Y array with X and Y being integers, said integers X and Y being smaller than said integers M and N, respectively, and at least one of said integers X and Y being greater than 1;

examining said pixels within said second array; and altering said pixels within said first array if said examined pixels within said second array substantially all correspond to the first color ink.

2. The method of claim 1, wherein said altering step comprises removing a portion of available pixels within said first array on which an ink drop may be deposited, said removed available pixels being removed in a checkerboard manner.

3. The method of claim 1, wherein said altering step comprises removing at least a portion of available pixels within said first array on which an ink drop may be deposited, said removed available pixels comprising all of said pixels within said first array that are disposed adjacent to said second array.

4. The method of claim 1, comprising the further step of determining whether a predetermined percentage of said pixels within said first array, exclusive of said pixels within said second array, correspond to the second color ink, said altering step being dependent upon said determining step and only occurring if said pixels within said first array corresponding to the second color ink are greater than or equal to said predetermined percentage.

5. The method of claim 4, wherein said predetermined percentage is 50 percent.

6. The method of claim 1, wherein said selecting step comprises associating said first array with a predetermined location on the image area, and comprising the further steps of:

associating said first array with a different predetermined location on the image area; and repeating said examining an altering steps.

7. The method of claim 6, wherein said second associating step comprises moving said first array a distance of one pixel in a predetermined direction.

8. The method of claim 1, wherein said integers M and N are between 3 and 10, and said integers X and Y are between 2 an 4.

9. The method of claim 8, wherein said integers M and N equal 6 and said integers X and Y equal 2.

10. The method of claim 1, wherein said integer M equals said integer N.

11. The method of claim 1, wherein said integer X equals said integer Y.

12. The method of claim 1, wherein said altered pixels comprise pixels corresponding to locations on the print medium onto which the second color ink is jetted.

13. The method of claim 1, wherein the second color ink is selected from a cyan, magenta and yellow ink.

14. The method of claim 1, wherein the first color ink is a true black ink.

15. The method of claim 1, wherein said altering step is dependent upon a number of the pixels within the first array which correspond to the second color ink.

16. A method of printing using an ink jet printer which jets a first color ink and a second color ink onto a print medium at locations defined by an image area having a plurality of pixels, said method inhibiting intercolor bleeding between the first color ink and the second color ink, said method comprising the steps of:

selecting a first array of pixels in the image area, said first array comprising an M×N array with M and N being integers;

defining a portion of the first array as a second array of pixels, said second array comprising an X×Y array with X and Y being integers, at least one of said integers X and Y being smaller than said integers M and N, respectively;

examining said pixels within said second array; and altering said pixels within said first array, exclusive of said pixels within said second array, if at least approximately 50 percent of said examined pixels within said second array correspond to the first color ink.

17. The method of claim 16, wherein said altering step is carried out if at least approximately 75 percent of said examined pixels within said second array correspond to the first color ink.

18. The method of claim 16, wherein said altering step is carried out if at least approximately 90 percent of said examined pixels within said second array correspond to the first color ink.

19. The method of claim 16, wherein said altering step comprises removing a portion of available pixels within said first array on which an ink drop may be deposited, said removed available pixels being removed in a checkerboard manner.

20. The method of claim 16, wherein said altering step comprises removing at least a portion of available pixels within said first array on which an ink drop may be deposited, said removed available pixels comprising all of said pixels within said first array that are disposed adjacent to said second array.

21. The method of claim 16, comprising the further step of determining whether a predetermined percentage of said pixels within said first array, exclusive of said pixels within said second array, correspond to the second color ink, said altering step being dependent upon said determining step and only occurring if said pixels within said first array corresponding to the second color ink are greater than or equal to said predetermined percentage.

22. The method of claim 21, wherein said predetermined percentage is 50 percent.

23. The method of claim 16, wherein said selecting step comprises associating said first array with a predetermined location on the image area, and comprising the further steps of:

associating said first array with a different predetermined location on the image area; and repeating said examining an altering steps.

24. The method of claim 23, wherein said second associating step comprises moving said first array a distance of one pixel in a predetermined direction.

25. The method of claim 16, wherein said integers M and N are between 3 and 10, and said integers X and Y are between 2 an 4.

26. The method of claim 25, wherein said integers M and N equal 6 and said integers X and Y equal 2.

27. The method of claim 16, wherein said integer M equals said integer N.

28. The method of claim 16, wherein said integer X equals said integer Y.

29. The method of claim 16, wherein said altering step is dependent upon a number of the pixels within the first array which correspond to the second color ink.

30. A method of printing using an ink jet printer which jets a true black ink and at least one additional color ink onto a print medium at locations defined by an image area having a plurality of pixels, said method inhibiting intercolor bleeding between the true black ink and the at least one additional color ink, said method comprising the steps of:

selecting a first array of pixels in the image area, said first array comprising an M×N array with M and N being integers;

defining a portion of the first array as a second array of pixels, said second array comprising an X×Y array with X and Y being integers, said integers X and Y being smaller than said integers M and N, respectively, said second array being centrally located within said first array;

examining said pixels within said second array; and altering said pixels within said first array, exclusive of said pixels within said second array, if said examined pixels within said second array substantially all correspond to the true black ink.

31. The method of claim 30, wherein said altering step comprises removing a portion of available pixels within said first array on which an ink drop may be deposited, said removed available pixels being removed in a checkerboard manner.

32. The method of claim 30, wherein said altering step comprises removing at least a portion of available pixels within said first array on which an ink drop may be deposited, said removed available pixels comprising all of said pixels within said first array that are disposed adjacent to said second array.

33. The method of claim 30, comprising the further step of determining whether a predetermined percentage of said pixels within said first array, exclusive of said pixels within said second array, correspond to the at least one additional color ink, said altering step being dependent upon said determining step and only occurring if said pixels within said first array corresponding to the at least one additional color ink are greater than or equal to said predetermined percentage.

34. The method of claim 33, wherein said predetermined percentage is 50 percent.

35. The method of claim 30, wherein said selecting step comprises associating said first array with a predetermined location on the image area, and comprising the further steps of:

associating said first array with a different predetermined location on the image area; and repeating said examining an altering steps.

36. The method of claim 35, wherein said second associating step comprises moving said first array a distance of one pixel in a predetermined direction.

37. The method of claim 30, wherein said integers M and N are between 3 and 10, and said integers X and Y are between 2 an 4.

38. The method of claim 37 wherein said integers M and N equal 6 and said integers X and Y equal 2.

39. The method of claim 30, wherein the at least one additional color ink comprises at least one of a cyan, magenta and yellow ink.

40. The method of claim 30, wherein said altering step is dependent upon a number of the pixels within the first array which correspond to the second color ink.

* * * * *